Patented Jan. 17, 1928.

1,656,660

UNITED STATES PATENT OFFICE.

CHARLES F. BRUSH, JR., OF CLEVELAND, OHIO, ASSIGNOR TO THE BRUSH LABORATORIES COMPANY, OF CLEVELAND, OHIO, A CORPORATION OF OHIO.

PROCESS OF MAKING BERYLLIUM AND ALUMINUM OXIDES.

No Drawing.   Application filed December 14, 1926.   Serial No. 154,855.

This invention relates to the process of extraction of beryllium and aluminum from ores containing them, such as beryl.

An object of the invention is to provide a relatively simple and cheap process for converting the beryllium and aluminum naturally occurring in ore into soluble beryllium and aluminum salts.

In order to render the beryllium and aluminum content of ore, such as beryl, soluble in sulphuric acid, the finely pulverized ore may be heated with an excess of an alkaline flux, such as sodium or potassium hydroxide or carbonate or calcium oxide or carbonate, to a temperature high enough to cause the flux to react with the ore forming a complex basic silicate containing the aluminum and beryllium originally present in the ore. The resulting product may then be treated with an excess of concentrated sulphuric acid to decompose the silicate of beryllium and aluminum and form the sulphates of berrylium and aluminum together with the sulphate of the flux. The formation of the complex beryllium and aluminum silicate may be advantageously carried out with sodium hydroxide or calcium carbonate as a flux as these are relatively cheap and easily obtainable. It is to be understood, however, that the other fluxes mentioned above may be used if desired.

In the case of sodium hydroxide the decomposition with sulphuric acid results in the formation of the sulphate of sodium and silica. The acidified mass may then be heated until fumes of the sulphuric acid are copiously evolved, in order to render the precipitated silica more easily removable. Water may then be added to this mixture in sufficient quantity to dissolve the soluble sulphates present, whereby a solution is obtained containing beryllium and aluminum and the sulphate of the flux if soluble. It is obvious that if a calcium oxide flux be used the insoluble calcium sulphate will not be present in this solution. This solution also contains part of the silica as a colloidal solution, the remaining silica being present as a precipitate.

The presence of the colloidal silica in the sulphate solution can to a large extent be avoided if the heated mass of ore and flux is mixed in successive increments with hot concentrated sulphuric acid, whereby the formation of colloidal silica is prevented and therefore silica can be separated in this manner from the sulphate solution.

The sulphate solution thus obtained contains as an impurity iron originally present in the ore together with the sulphate of the flux if such sulphate is soluble, as is the case with sodium. The solution is then filtered to free it from the precipitated silica and the insoluble impurities.

If the solution be formed by the method whereby a small part of the silica is present as a colloidal solution, the solution is difficult to filter and the removal of the silica at this point is not complete. Such solution is preferably concentrated by evaporation, and a large quantity of the soluble sodium sulphate crystallized and removed. The crystallization of the sodium sulphate from this solution also causes the removal of much of the colloidal silica by occluding it in the sodium sulphate crystals which are freed from the liquid in any suitable manner, as by filtration.

If it be desired to remove part of the aluminum from the solution at this point, the concentration of the solution may be continued until some sodium alum is crystallized out, without causing the beryllium sulphate to be crystallized out, thus leaving a lower percentage of aluminum salt with the beryllium. If calcium oxide has been used as a flux and it be desired to remove a portion of the aluminum present in the mixture of the aluminum and beryllium sulphates, sodium sulphate may be added to form with the aluminum sulphate the less soluble sodium alum which will be crystallized out, leaving a mixture of the beryllium and aluminum sulphates in solution. Considerable of the aluminum sulphate may be removed from the sulphate solution in this manner without causing the crystallization of any substantial quantity of beryllium sulphate.

When the major portion of the sodium sulphate has been so removed and the volume of the solution accordingly reduced, the solution may be heated with a small amount of a suitable oxidizing agent, such as nitric acid, to effect the oxidization of the iron to a ferric condition. In order to remove the iron, the solution may be substantially neutralized and potassium ferrocyanide added in sufficient quantities to precipitate the iron and this precipitate separated from the solution in any suitable manner, as by filtration.

If calcium oxide be used as a flux in the original treatment of the ore and the silica removed as described above, this solution may also be freed from iron in this same manner. If more complete removal of the iron be desired, the solution may be diluted before the addition of the potassium ferrocyanide. It will also be understood that any other well known method for removal of the iron may be used at this point in the process, such other methods, for example, being the use of calcium sulphide or oxalic acid. If any colloidal silica should still remain in the solution before the solution is freed from the iron, the precipitation of the iron carries with it practically all of the remaining colloidal silica.

The resulting solution contains the sulphates of aluminum and beryllium and sodium sulphate, if sodium hydroxide was originally used as a flux. The solution is then evaporated to dryness and the salts heated to drive off the sulphuric acid, leaving the oxides of beryllium and aluminum, and if sodium hydroxide has been used as a flux sodium sulphate will also be present. If the sodium sulphate is present, it may be removed at this point by leaching the mixture of beryllium and aluminum oxides with water and separated from the oxides in any suitable manner, as by filtration, and the oxides then heated to dryness.

It will thus be seen that I have provided a relatively simple and effective method of forming the mixture of beryllium and aluminum oxides from an ore such as beryl, and that these oxides are produced in relatively pure form.

The mixture of the oxides of beryllium and aluminum is particularly useful in the production of aluminum and beryllium alloys which may be produced, for example, by the direct electrolysis of the mixed oxides, thus avoiding the relatively difficult chemical separation of the aluminum and beryllium. It will also be seen that the amount of aluminum oxide with respect to the beryllium oxide can be controlled by my process by carrying out the crystallization of the sodium alum to the desired point to reduce the amount of aluminum in the mixture of the sulphates from which the oxides are formed.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. In the process of making a mixture of beryllium and aluminum oxides from an ore containing these metals, the steps of heating the ore with an alkaline flux, decomposing the mass with sulphuric acid and dissolving the beryllium and aluminum content of the ore as sulphates, removing the silica, iron and other impurities from the mixed sulphates of aluminum and beryllium, and heating the mixture of the sulphates to produce a mixture of the corresponding oxides of these metals.

2. In the process of making a mixture of beryllium and aluminum oxides from beryl, the steps of heating the beryl with sodium hydroxide, decomposing the heated mass with sulphuric acid to form sulphates of the beryllium and aluminum and sodium, purifying the mixture of the sulphates from other substances, heating said mixture to drive off the sulphuric acid content to form a mixture of the beryllium and aluminum oxides.

3. In the process of making a mixture of beryllium and aluminum oxides, the steps of heating the ore containing these metals with an alkaline flux, adding the resulting mass in successive increments to hot concentrated sulphuric acid to decompose the mass and form a mixture of beryllium and aluminum sulphates without dissolving the silica, removing the iron from the mixture of sulphates and heating the sulphates to produce a mixture of the corresponding oxides.

4. In the process of extracting beryllium and aluminum from beryl, the steps of heating the beryl with an alkaline flux, decomposing the mass with sulphuric acid to form sulphates of the beryllium and aluminum, removing the silica and iron from the mixture of the sulphates, and forming the oxides of the beryllium and aluminum.

5. In the process of making a mixture of beryllium and aluminum oxides from an ore containing these metals, the steps of heating the ore with sodium hydroxide, decomposing the mass with sulphuric acid to form sulphates of beryllium, aluminum and sodium, purifying the mixture of the sulphates, removing the desired amount of the aluminum content of the mixture by crystallizing out such aluminum as sodium alum, and heating the beryllium and aluminum sulphates to form the corresponding oxides.

6. In the process of making beryllium oxide from beryllium minerals containing aluminum, the steps of converting the beryllium and aluminum into sulphates, freeing a mixture of these sulphates from other substances, and igniting the mixture of sulphates to produce a mixture of the corresponding oxides.

7. In the process of making beryllium oxide from beryllium minerals containing aluminum, the steps of converting the beryllium and aluminum into sulphates, freeing a mixture of the beryllium and aluminum sulphates so formed from any other other sulphates that may be present and silica, and igniting the mixture of beryllium and aluminum sulphates to produce a mixture of the corresponding oxides.

In testimony whereof I affix my signature.

CHARLES F. BRUSH, Jr.